M. L. J. GIRDANY.
EAR RING.
APPLICATION FILED JUNE 3, 1908.
943,185.
Patented Dec. 14, 1909.
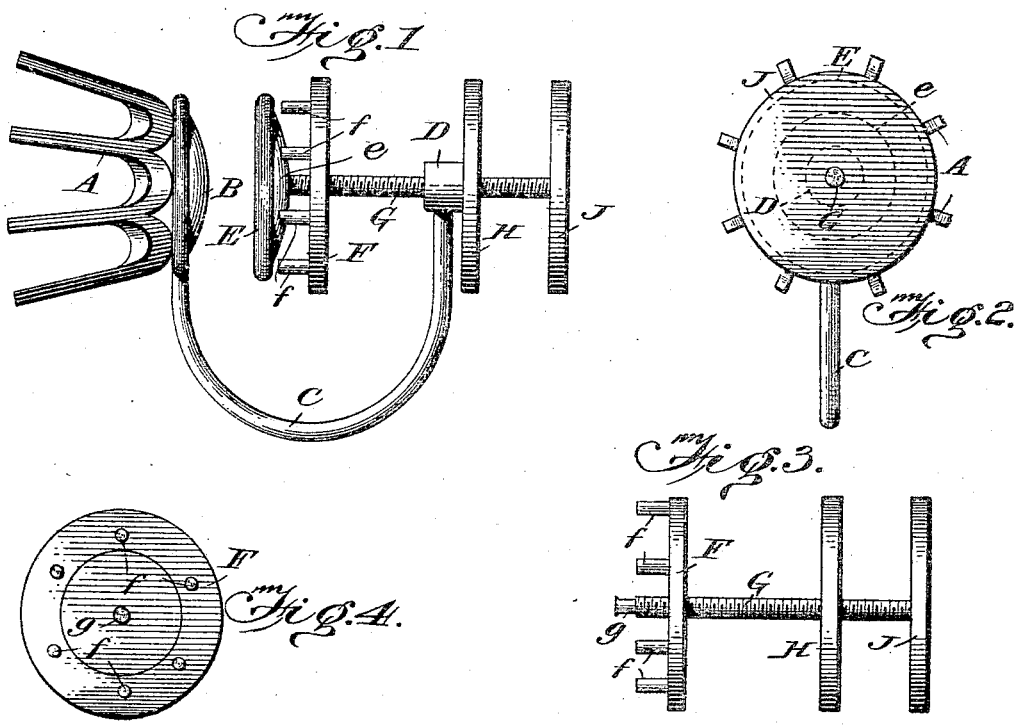

UNITED STATES PATENT OFFICE.

MORRIS L. J. GIRDANY, OF BOSTON, MASSACHUSETTS.

EAR-RING.

943,185. Specification of Letters Patent. Patented Dec. 14, 1909.

Application filed June 3, 1908. Serial No. 436,507.

*To all whom it may concern:*

Be it known that I, MORRIS L. J. GIRDANY, a citizen of the United States of America, and a resident of the city of Boston, in the county of Suffolk and State of Massachusetts, have invented certain new and useful Improvements in Ear-Rings, of which the following is a specification.

My invention relates to improvements in ear ornaments which are fastened to the ears by means of a friction gripping device (instead of by holes in the ears and hooks or rings) in such a way and by such means as will make possible a firm, secure, strong, and locked grip without injuring or tearing the skin of the ears due to the turning of the movable grip either accidentally or intentionally while adjusting the ornament securely to the ear. I attain these objects by the mechanism illustrated in the accompanying drawings, in which—

Figure 1 is a side elevation of an ear ornament showing gripping device operated by means of a revolving screw, and locking device, and grip strengthening device, and setting for stone. Fig. 2, an end elevation. Fig. 3, a side elevation of the movable grip mechanism detached from the ornament and with the gripping disk detached from it. Fig. 4, an end elevation of the movable grip mechanism with the gripping disk detached. In Figs. 1 and 2 the gripping disk is fitted loose to the screw G and free to turn on the bearing g.

Similar letters refer to similar parts throughout the several views.

The setting for jewels or stones A, the stationary grip B, the looped wire C, and the nut D, constitute the ear ornament; and the traveling screw G, the traveling grip E, and the screw head J, the gripping device.

The grip reinforcing device consists of the disk F which carries the lugs f and is strongly and securely fastened to the screw G in such a position that the ends of the lugs f just clear the rim of the grip E so that the gripping disk E when it is applied to an irregular surface will be prevented from being forced out of the vertical and also from bending or loosening its attachment to the screw G. The locking device consists of a traveling nut H which may be jammed against the fixed nut D thereby jamming and locking the screw G until the lock nut H is slackened and backed off.

The operation of the instrument is as follows:—The lobe of the ear is inserted in the opening between the stationary grip B and the movable grip E. The width of the opening may then be lessened, thereby gripping the ear, by turning the screw G. When any portion of the periphery of the grip E strikes the irregular surface of the ear, any further pressure on this grip tends to throw it out of vertical and injure the loose joint at g and this is prevented by the lugs f which prevent any movement from the vertical of the rim of the disk E. When the grip E is screwed up sufficiently tight to keep it in place it may be locked and the screw G be prevented from turning while the wearer is dancing or exercising or unconsciously meddling with it, by screwing the lock nut H up against the nut D. The ornament is taken off the ear by loosening and backing off the lock or jam nut H and then turning the screw G.

The movable grips in the ear ornament art to-day in common use are rigidly fastened to turning screws and turn with them, and the defects of these instruments are:—1. The turning grip lacerates the skin of the ear when screwed up hard and turned. 2. The grip works loose and the ear ornament is lost while the wearer is exercising or after unconsciously tampering with and loosening it. 3. The movable grip having necessarily a slender fastening to the screw shaft g and a comparatively large periphery on account of the excessive leverage and strains becomes loose and inoperative or lost altogether in a short time. All of which defects are remedied for the first time by my invention.

I therefore do not intend to claim such a combination broadly; but,

What I do intend to claim as my invention and desire to secure by Letters Patent, is—

1. In an earring, a reinforcing disk provided with lugs or pins and attached to a screw working through a fixed nut and carrying a loose ear gripping disk, for the purposes set forth.

2. In an earring, the combination of a screw, and an ear gripping disk on the end of the screw, and a nut through which the screw travels, and a reinforcing disk carrying lugs or pins, and a traveling lock-nut which travels on the screw, all substantially as described and for the purposes set forth.

In testimony whereof I have affixed my signature, in presence of two witnesses.

MORRIS L. J. GIRDANY.

Witnesses:
INA BAKER,
JOHN J. BOWES.